Nov. 23, 1943.  G. C. AREY  2,334,893
INNER TUBE FOR PNEUMATIC TIRE CASINGS
Original Filed March 11, 1935
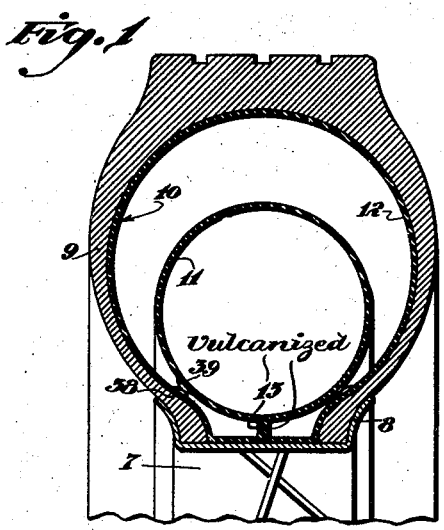
INVENTOR.
BY Gordon C. Arey
Wood & Wood
ATTORNEYS Patented Nov. 23, 1943

2,334,893

UNITED STATES PATENT OFFICE 2,334,893

INNER TUBE FOR PNEUMATIC TIRE CASINGS

Gordon C. Arey, Fort Thomas, Ky.

Original application March 11, 1935, Serial No. 10,348. Divided and this application December 22, 1938, Serial No. 247,278

12 Claims. (Cl. 152—342)

This invention relates to pneumatic tires and is particularly directed to improvements in the inner tubes conventionally associated therewith. A great many deaths and serious accidents and great inconvenience occur because of "blowouts" or the quick escape of air from the tube as occasioned by sudden breaks in the casings caused by weakness, excessive pressure, nails, or any factor permitting the complete escape of air before the driver can reduce speed or stop. Particularly have these accidents increased since the advent of high speed cars and oversize or balloon tires. These large tires, when collapsed suddenly at high speed, twist very badly and cause entire lack of control.

It is the object of the present invention to provide an improved inner tube construction, incorporating a reserve tube in the nature of a safety tube or secondary defense against blowouts or quick leaks which accomplishes any or all of the following results: first, makes it impossible for sudden complete collapse of the tire to occur; second, supports the casing and car even though the normal inner tube is badly punctured or torn; third, supports the casing at a lowered pressure lessening the chances of damage to the reserve tube because of the factor originally causing the break in the inner tube; fourth, gives the driver warning and time to slow down; fifth, enables the driver to get to a service station in the majority of cases; and sixth, preferably involves a novel integral or one-piece structure for the inner tube and reserve tube.

It is a further object of this invention to provide an improved inner tube of safety construction as above outlined, incorporating an improved valve arrangement, whereby any or all of the following results are achieved: first, the tube may be inflated in the normal way, automatically inflating the reserve tube at the same pressure; second, the air in the respective tubes may be maintained at equal pressures by automatic movement of the valve, which may be initiated by movement of the car; third, the air in the reserve tube is instantly trapped in the event of fairly rapid or sudden drop in pressure in the main tube as caused by a fast leak or blowout; and fourth, voluntary release of air is permitted from both chambers without difficulty or inconvenience, as when the driver wishes to deflate the tire.

The above objects are fulfilled and the invention exemplified in a structure set forth in detail hereinafter, and of the following general nature. The reserve tube is of smaller diameter than the main tube and may be formed therewith or attached thereto at the inner side of the inner circumference thereof. The valve in one form may be compound, including a main valve controlled inlet to the outer or normal tube and a valve controlled passageway from the normal tube to the safety or reserve tube. These valves in these passageways open to external pressures and close to internal pressures. The passageway to the reserve tube may lead directly from the main passageway as a branch thereof, if desired. Other valve structure may be used provided the air in the reserve tube is trapped in the event of sudden leakage from the normal tube. For example, there may be a separate valve in the wall of the reserve tube with the main valve stem leading directly into the reserve chamber and the air passing freely to the normal chamber from the reserve chamber during filling because of the factors of slow flow and the type of the valve utilized. A suddenly or moderately suddenly created differential in the pressures will cause the aforesaid trapping of the air contained in the reserve tube, whereupon the valve in the wall of the reserve tube will close. Thus, the reserve tube may enlarge and take the place of the normal tube for supporting the casing, with a proportionate drop in pressure due to the increased cubical content of the reserve tube.

This application is divisional of copending application, Serial Number 10,348, filed March 11, 1935, which matured into Patent 2,207,212, July 9, 1942.

Other objects and further advantages will be more fully apparent from a description of the accompanying drawing, in which:

Figure 1 is a fragmentary transverse sectional view of a tire casing and the improved tube showing the same mounted on a wheel.

Figure 2 is a fragmentary sectional view enlarged out of Figure 1, detailing the seam of the integral tube structure.

Figure 3 is an enlarged cross sectional view of the inner tube detailing the compound valve and the associated reserve tube.

Figure 4 is a view taken similar to Figure 3, but showing a modified form of valve.

Figure 5 is a view taken similar to Figure 3, but showing separate valves, one a main filling valve entering the reserve tube and the other disposed in the wall of the reserve tube and controlling flow from the reserve tube to the normal tube.

Figure 6 is a fragmentary view taken similar to Figure 3 but showing another form of valve in the reserve tube wall.

Figure 7 is a fragmentary internal face view of the reserve tube wall showing the valve of Figure 6.

Referring to the drawing, a conventional wheel structure is shown at 7, the rim thereof at 8 and the tire casing at 9. The tube is generally shown at 10 within the casing 9 and, as preferred, is formed to provide the reserve tube 11 and normal tube 12 as one element. This is done by turning in the inner circumferential portion of a large tube to form the reserve tube (see Figure 1), and vulcanizing the abutting portion as at 13 (see Figure 2).

This provides a reserve tube connected to or united with the main tube along its inner periphery. This tube, as formed of high grade rubber, will yield and stretch freely. The outer tube is limited as to its expanded size by the size of the casing which it inflates. The reserve tube will become inflated as the air is delivered through any one of the various valves disclosed to a normal size or diameter considerably less than that of the outer tube. As attached, this smaller diameter reserve tube is offset (see transverse section through the tube) and has its side and outer wall spaced from the outer tube. In other words, there is no intention to place this reserve tube is working position until an emergency arises. However, its elasticity will permit it to expand to the size of the normal tube contacting the same for replacing or taking the load if the outer tube should be punctured.

As shown in Figure 3, the valve stem 15 may be secured in the tube wall by flanges and nuts in the normal manner in which the stem has been secured in a conventional tube. The valve stem 15 may extend through the side wall of the tube in the region of the seam 13 to the reserve tube.

The valve stem 15 has screw threads at its outer end for the attachment of a closure cap thereof. The air is delivered into the stem through the conventional hose applied in the conventional manner against the end of the stem. A one-way air inlet valve 17, of well known make, is screwed into the outer end of the stem. The passageway 18 of the stem proceeds angularly as at 19 into the outer tube. Diametrically opposite thereto a passageway 20 extends radially to the center of the stem and axially to the interior of the reserve tube.

The attached or inner end of the stem is thickened or includes a head 21 for the inclusion of the aforesaid passageways and includes a flange 22 lying against the inner wall of the reserve tube. Any well-known method of attaching the stem may be used, of course, providing that entry to the two tubes is afforded.

A valve 23 is loosely contained in an enlarged portion of the axial passageway 24 leading into the reserve tube. Radially inwardly extended tangs or portions 25, deformed from the metal of the stem at its extreme inner end, prevent displacement of the valve from its chamber, but permit free flow of air to the reserve chamber when the valve is unseated. The valve is adapted to seat on a tapered valve seat 26, when moved outwardly by pressure within the reserve tube, but cannot seat against the retaining tangs. A plug 27 is screwed into the main passageway of the stem between the passageway 19 and the passageway 20 and may be conveniently unscrewed upon removal of the control valve 17 in the stem to permit insertion of a tool and unseating of the valve 23 when the air is to be released from the reserve tube.

As shown in the form disclosed in Figure 4, the main passageway 18 of the valve stem may extend directly to the reserve tube with a valve seat 26 formed therein between the reserve tube and the angular passageway 19 leading to the main tube. The valve stem may be vulcanized in place as shown in Figure 4 in accordance with prevailing practice.

Now in either form, the air is free to flow equally to either chamber, that is either the reserve tube or the main tube, although it is believed preferable to cause the air to flow through the outer chamber into the inner or reserve chamber. The tubes are figured as to size and relation to provide the same cubical content for each. The respective passageways and the clearance for the inner valve may be of cross sectional areas providing uniform or equal passageways for uniform flow to the respective chambers.

The valve 23 floats or unseats freely so that, although the pressures in the respective chambers may be unequal immediately after inflation, movement of the car will cause unseating of the valve. By the arrangement shown in Figure 3, the inner chamber cannot become inflated at a higher pressure than the outer chamber since the air must first pass through the outer chamber. Therefore, the valve can bleed air from the outer to the inner chamber until equal pressure exists. Accordingly, this arrangement, considering these two forms, is preferred.

However, if the rate of flow is properly controlled by the size of the passageways, the arrangement of Figure 4 is equally efficient. Also, a third arrangement is available, as shown in Figure 5, if desired.

In this third form, the valve stem is of conventional structure, that is, encloses the single conventional inlet valve 17. This stem is secured through the tube walls at the seam so that its passageway enters the reserve chamber only. There is no space between the tube walls immediately adjacent the seam, the walls separating gradually due to the different diameters of the tubes. In the opposite or outer wall of the reserve tube, a valve 30 is mounted. The tube wall is thickened and molded about a sleeve element 31. This sleeve includes two or adjacent tapered seats 32 and 33. A very light coil spring 34, having a footing on an internal abutment flange 35 at the outer end of the stem, holds the valve against the inner seat, which seat is only an abutment since the seating taper of the valve is longitudinally slotted as at 37 permitting flow of air past the valve even when seated.

Thus, when air flows into the reserve tube at the normal delivery rate, the valve will not seat on the outer seat 32 but will permit the air to flow into the outer tube until the proper pressure is reached in both tubes. Sudden relief of pressure in the outer tube will cause the valve 30 to operate relative to the passageway or port for restraining the air in the reserve tube under the influence of the normal reserve pressure of the reserve tube. This port is of an effective cross-sectional area at least substantially as great as that of the valve mechanism in the valve stem through which the tube is inflated.

It will be understood that the reserve tube wall is of a thickness and elasticity permitting this expansion when the emergency occurs. At the same time, it will be sufficiently rigid to normally retain the size shown when air also enters the main chamber.

As shown in Figures 6 and 7, another form of valve is provided which is highly efficient and will not get out of order. It is of great importance that this valve in the reserve tube wall requires no attention since it is inaccessible. A port 40 is provided in the wall of the reserve tube. The port may include an eyelet 41 for valve seating and thickening purposes if desired.

A strip 42 of rubber formed integrally or vulcanized to the reserve tube wall is disposed across this port on the inside of the reserve tube. This strip, since it is straight, is not in contact with the normally curved tube wall. A valve portion 43 of the strip in the form of a conical teat 44 extends outwardly adjacent the port and in axial alignment therewith.

Now as shown with the tubes inflated, this teat is not seated nor will it seat as air is admitted to the reserve chamber and through the port into the normal chamber in filling the tube. However, when the pressure drops abruptly in the outer chamber, the standing pressure within the reserve chamber presses the elastic strip 42 outwardly and seats the valve restraining the air in the inner chamber.

This pressure, sealing the reserve chamber, will be aided by the changing curvature of the reserve tube wall as it expands, since the teat of the elastic strip will be moved closer to the wall of the reserve tube. This occurs since the curvature of the wall becomes less. Now it will also be evident that the normal elasticity of the strip tending to keep it straight will resist flexing of the strip under inside pressure during filling. In other words, the built up pressure, suddenly relieved through the port when there is a puncture, quickly sets the valve, and the changing curvature of the reserve tube wall tends to aid in keeping it seated.

In Figure 1, the reserve tube is illustrated in contact as at 38 with the sides of the outer or main tube. This seating of the reserve tube prevents swaying thereof within the main tube which may well occur since the pressures in these tubes normally are equal. Also, the tube walls may be thickened at intervals around their circumferences to provide points of contact as indicated at 39, whereby the tubes will not become worn through their respective walls in the event of relative movement causing rubbing. The air is free to pass between the spaced thickened portion.

The method of forming the tube, disclosed herein, is disclosed and claimed in a copending application.

Having described my invention, I claim:

1. A tube for pneumatic tire casings, comprising: a main chamber, an inner smaller chamber contained within the main chamber and attached thereto along the inner periphery thereof, a valve stem attached to the tube, said valve stem incorporating a main air passageway extending to the interior of the outer chamber, a valve in said passageway seating to internal air pressure and opening to external air pressure, a passageway leading through said stem from the outer chamber to the inner chamber, and a valve in said latter passageway opening to air pressure through said passageway from the outer chamber to the inner chamber but closing to internal air pressure within the inner chamber greater than the air pressure in the outer chamber.

2. A valve stem and valve assembly for use in simultaneously inflating and deflating a duplex inner tube comprising, a unitary tubular valve stem having a branch passage communicating with the interior thereof at a point adjacent its middle, said branch passage providing for the flow of air in either direction at all times, a check valve positioned in the opening in the stem at each side of the branch passage, said valves opening in the same direction and adapted to open inwardly simultaneously to inflate the duplex tube.

3. A valve stem for use in simultaneously inflating and deflating a duplex inner tube comprising, a unitary valve stem having a single opening at its outer end into which the air is supplied and branch passageways extending from said opening through the stem, one extending to the inner end of the stem and the other extending laterally from the first passageway out of the side of the stem, valve means in the opening at the outer end of the stem and a second valve means in the first passageway adapted to control the flow of air through the second branch passageway in the event that the pressure in the second branch passageway is lower than the pressure beyond the last named valve means.

4. A valve stem for dual or double tire tubes of the type having inner and outer tube members comprising, a stem proper secured to both tube members and provided with a bore therethrough, means placing said bore in communication with both tube members, valve means for sealing said bore outwardly of the first named means, and valve means in said bore automatically operating to control the communication between said bore and said inner tube.

5. A tire valve stem having a check valve therein and a plurality of ducts below the check valve, and means for simultaneously metering the flow of fluid through said ducts which may pass said check valve when open.

6. A tire valve stem having a check valve therein controlling the delivery of air thereto and a plurality of ducts beyond the valve and leading from the valve stem, and means restraining the flow of air through one of the ducts, the other of said ducts being unobstructed so that the air can pass in either direction without restraint.

7. A tire valve stem for inflating a double tire tube of the type including two chambers; including a main passageway branching to constitute passageways into the respective chambers, a valve for controlling the main passageway, and a second valve controlling one of the branch passageways, either of said valves opening to external pressure and seating to internal pressure.

8. A tire valve stem for inflating a double tire tube of the type including two chambers; including a main passageway branching to constitute passageways into the respective chambers, a valve for controlling the main passageway, a flow control means in one of the branch passageways restraining the flow of air through said last named passageway in the event that the air is exhausted from the main passageway.

9. A valve stem for use in simultaneously inflating and deflating duplex inner tubes, said stem having a substantially straight opening extending throughout its length and a laterally projecting branch opening communicating with the opening in the stem at a point intermediate its ends, and two valves in said stem opening in the same direction, one on each side of the branch opening, said straight opening beyond the laterally projecting branch opening including a portion of reduced diameter constituting means for supporting and retaining the inner of said valves, said valves adapted to open simultaneously for inflating said tubes.

10. A valve stem for use in simultaneously inflating and deflating a duplex inner tube comprising a unitary valve stem having a single opening at its outer end into which the air is supplied and branch passageways extending from said opening through the stem, one extending to the inner end of the stem and the other extending laterally from the first passageway out of the side of the stem, valve means in the opening at the outer end of the stem and a restraining means in the first passageway adapted to control the flow of air through the second branch passageway in the event that the pressure in the second branch passageway is lower than the pressure beyond the restraining means.

11. A tube for pneumatic tire casings, comprising an outer main chamber, an inner smaller chamber contained within the main chamber and attached thereto along the inner periphery thereof, a valve stem attached to the tube, said valve stem incorporating a main air passageway extending to the interior of the outer chamber, a valve in said passageway seating to internal air pressure and opening to external air pressure, a passageway leading through said stem from the outer chamber to the inner chamber, and said last-named passageway being restricted at its inner end, the restriction being effective for restraining the flow of air from the inner chamber to the outer chamber in the event there has been escape of air from the outer chamber.

12. A valve stem for use in simultaneously inflating and deflating a duplex inner tube comprising a unitary valve stem having a single opening at its outer end into which the air is supplied, valve means in said opening controlling the flow of air into said opening, a first passageway extending laterally from said opening and being unrestricted, and a second passageway extending toward the inner end of said stem, said latter passageway having a restricted opening at the inner end of the stem, said restricted opening adapted to control the flow of air through the second passageway in the event that the pressure in the second passageway is lower than the pressure beyond the restricted opening at the inner end of the stem.

GORDON C. AREY.